(12) United States Patent
Jenkins et al.

(10) Patent No.: US 12,745,109 B2
(45) Date of Patent: Sep. 22, 2026

(54) NEURAL NETWORK BASED SIGNAL-TO-NOISE RATIO PREDICTION IN MOBILE NETWORKS

(71) Applicant: L3Harris Technologies, Inc., Melbourne, FL (US)

(72) Inventors: Stephen N. Jenkins, Layton, UT (US); Matthew R. Rohrer, South Jordan, UT (US); Chad S. Komer, Tooele, UT (US)

(73) Assignee: L3Harris Technologies, Inc., Melbourne, FL (US)

( * ) Notice: Subject to any disclaimer, the term of this patent is extended or adjusted under 35 U.S.C. 154(b) by 316 days.

(21) Appl. No.: 18/675,729

(22) Filed: May 28, 2024

(65) Prior Publication Data

US 2025/0374076 A1 Dec. 4, 2025

(51) Int. Cl.

*H04W 24/02* (2009.01)
*H04L 41/16* (2022.01)
*H04W 16/22* (2009.01)

(52) U.S. Cl.

CPC ............. *H04W 24/02* (2013.01); *H04L 41/16* (2013.01); *H04W 16/22* (2013.01)

(58) Field of Classification Search

CPC ........ H04W 24/02; H04W 16/22; H04L 41/16
See application file for complete search history.

(56) References Cited

U.S. PATENT DOCUMENTS 7,412,241 B2 8/2008 Strutt
7,436,810 B2 10/2008 Ma et al.
7,555,468 B2 * 6/2009 El-Damhougy .... H04W 40/246 706/14
8,280,428 B2 10/2012 Pietraski
8,724,493 B2 * 5/2014 Schoeller .............. H04W 24/10 370/252
9,634,742 B2 * 4/2017 Li ......................... H04L 1/0032
11,126,660 B1 9/2021 Sen et al.
11,570,636 B2 * 1/2023 Ergen .................. H04W 72/541
12,490,309 B2 * 12/2025 Ward ................ H04W 74/0816

(Continued)

OTHER PUBLICATIONS

Koushik et al., “Deep ${Q}$-Learning-Based Node Positioning for Throughput-Optimal Communications in Dynamic UAV Swarm Network,” IEEE Transactions on Cognitive Communications and Networking, vol. 5, No. 3, Sep. 2019, pp. 554-566.

(Continued)

*Primary Examiner* — Ajay Cattungal
(74) *Attorney, Agent, or Firm* — Fox Rothschild LLP; Carol E. Thorstad-Forsyth

(57) ABSTRACT

Predicting link outages in a mobile network. A method includes obtaining a first array of time series data comprising magnitude values of a first communication property beginning at a first time. A second array of time series data comprising angle values of a second communication property beginning at the first time, correlated to the first array is obtained. The first array is modulated with the second array to obtain a first modulated array. The first modulated array is normalized to obtain a first normalized modulated array. The first normalized modulated array is provided to a trained time-series forecasting model. As a result, one or more predicted SNR values are obtained from the trained time-series forecasting model.

20 Claims, 6 Drawing Sheets

(56) References Cited

U.S. PATENT DOCUMENTS

| | | | | |
|---|---|---|---|---|
| 2006/0187884 | A1* | 8/2006 | Ma | H04W 40/16 370/332 |
| 2020/0225321 | A1* | 7/2020 | Kruglick | G01S 7/417 |
| 2021/0357742 | A1* | 11/2021 | Restuccia | H04L 27/34 |
| 2022/0393951 | A1* | 12/2022 | Potluru | G06N 3/0499 |
| 2024/0196242 | A1* | 6/2024 | Ku | H04W 24/10 |
| 2024/0284522 | A1* | 8/2024 | Dutta | H04B 7/15557 |

OTHER PUBLICATIONS

Kwon et al., "Intelligent IoT Connectivity: Deep Reinforcement Learning Approach," IEEE Sensors Journal, vol. 20, No. 5, Mar. 1, 2020, pp. 2782-2791.

Mao et al., "Deep Learning for Intelligent Wireless Networks: A Comprehensive Survey," IEEE Communications Surveys & Tutorials, vol. 20, No. 4, Fourth quarter 2018, pp. 2595-2621.

Meng et al., "Deep Reinforcement Learning-Based Topology Optimization for Self-Organized Wireless Sensor Networks," IEEE Global Communications Conference (GLOBECOM), 2019, pp. 1-6.

Park et al., "Communication-Efficient and Distributed Learning Over Wireless Networks: Principles and Applications," Proceedings of the IEEE, vol. 109, No. 5, May 2021, pp. 796-819.

Simsek et al., "IAB Topology Design: A Graph Embedding and Deep Reinforcement Learning Approach," IEEE Communications Letters, vol. 25, No. 2, Feb. 2021, pp. 489-493.

* cited by examiner

NEURAL NETWORK BASED SIGNAL-TO-NOISE RATIO PREDICTION IN MOBILE NETWORKS

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing system's ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Some computing systems communicate using ad-hoc mesh networks, which are typically wireless decentralized networks where the various nodes in the mesh network perform network management functions such as topology decision making, including adding new nodes to the network, removing nodes from the network, routing data from one node to another node, often through other nodes in the network, etc. One example of such a network is a code division multiple access (CDMA) mobile ad-hoc network (MANET).

As its name implies, at least some nodes in a MANET are mobile, meaning that they move through an environment. For example, a mobile node may be part of an aircraft that travels through the environment.

MANET radios, at MANET nodes, operate in dynamic environments that pose numerous problems for establishing and maintaining wireless links in MANETs. As nodes move through an environment, they establish new links as prior links become degraded and unusable. If nodes are not active in establishing new links before prior links break, they risk becoming isolated from the network or even causing network fragmentation and adversely affecting other nodes in the network. One physical layer topology management objective is to mitigate link outages through outage prediction and reforming the physical links to meet mission objectives. Accurately predicting link outages is a difficult problem with high computational complexity for embedded devices. In particular, systems have limited processing available to perform complex array math and linear algebra.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that includes acts for training a neural network for link outage prediction in mobile networks comprising mobile vehicles. The method includes obtaining a first array of time series data comprising magnitude values of a first communication property beginning at a first time. The method further includes obtaining a second array of time series data comprising angle values of a second communication property beginning at the first time, correlated to the first array. The method further includes obtaining a third array of time series SNR values correlated to the first and second arrays by a time offset. The method further includes modulating the first array and the third array with the second array to obtain a first modulated array and a third modulated array. The method further includes normalizing the first modulated array and the third modulated array to obtain a first normalized modulated array and a third normalized modulated array. The method further includes training a time-series forecasting model using the first normalized modulated array and the third normalized modulated array.

An alternative embodiment includes a method of predicting link outages in a mobile network. The method includes obtaining a first array of time series data comprising magnitude values of a first communication property beginning at a first time. A second array of time series data comprising angle values of a second communication property beginning at the first time, correlated to the first array is obtained. The first array is modulated with the second array to obtain a first modulated array. The first modulated array is normalized to obtain a first normalized modulated array. The first normalized modulated array is provided to a trained time-series forecasting model. As a result, one or more predicted SNR values are obtained from the trained time-series forecasting model.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
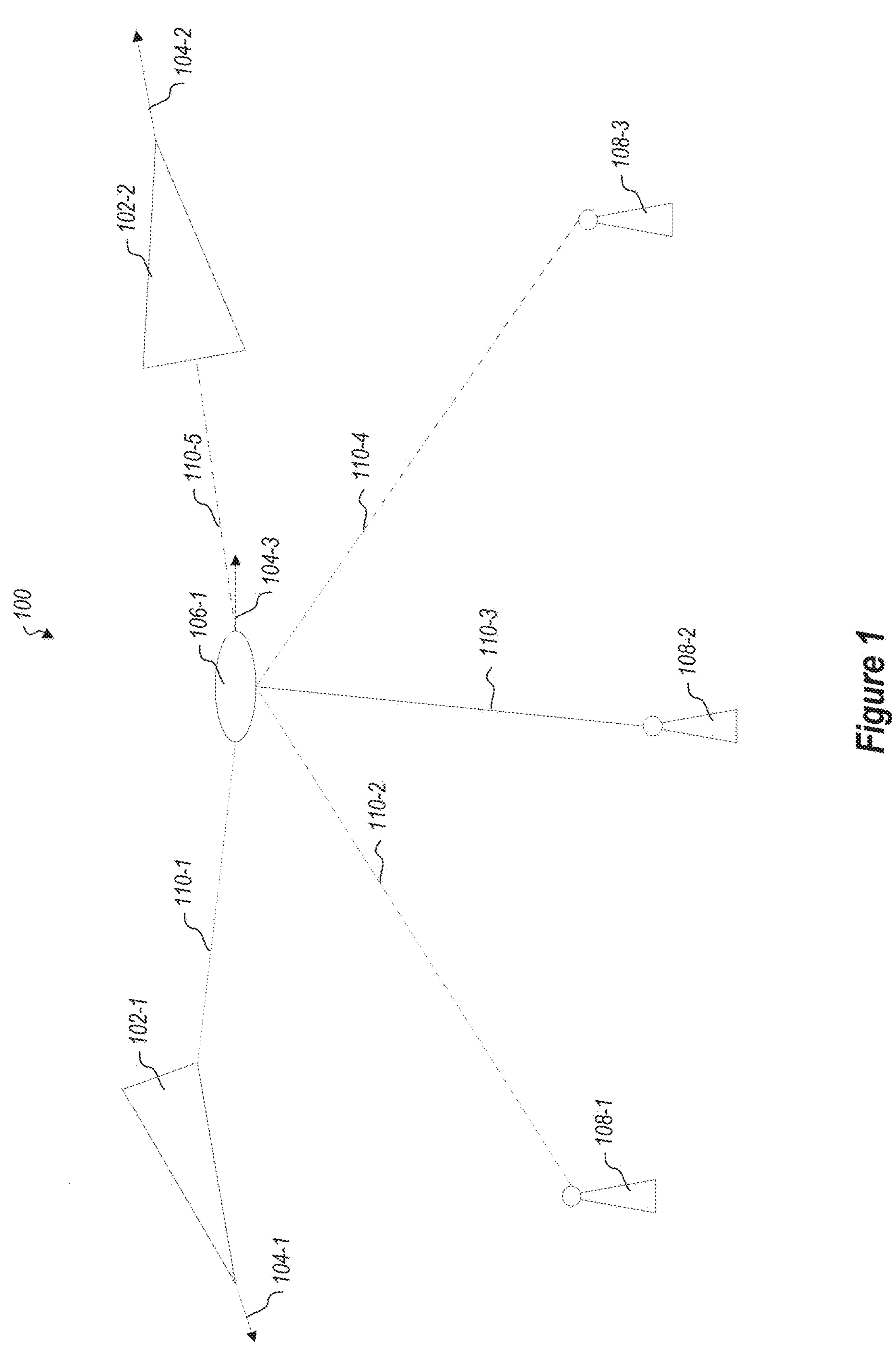
FIG. 1 illustrates a mobile network including a plurality of nodes where the mobile network is configured to perform neural network based link outage prediction and mitigation.

Embodiments illustrated herein are directed to predicting link outages in mobile networks. Based on predicting link outages, determinations can be made as to whether sufficient other links exist to maintain sufficient communications in the mobile network and/or whether new links should be established to maintain sufficient communications in the mobile network.

Embodiments may include predictive functionality that is based on previous circumstances, conditions, and/or results related to previously existing links in the mobile network. This is distinct from previous systems, which did not consider these previously existing factors.

In some embodiments, a neural network, or other machine learning model, is trained using these previously existing factors to train a time-series forecasting model. The time-series forecasting model is then used to predict link outages by using current factors as input data.

In particular, the previously existing factors are: (a) collected using various sensors, (b) modulated and normalized, and (c) used to train a time-series forecasting model. Even more particularly, an array of magnitude values of wireless communication properties at a particular time is obtained, an array of angle values of wireless communication properties at the particular time is obtained, and an array of SNR values corresponding, by a time offset, to arrays of magnitude values and angle values is obtained. Magnitude values in the array of magnitude values are modulated with the corresponding angle values in the array of angle values to obtain an array of modulated magnitude values. The array of modulated magnitude values is normalized to create an array of normalized modulated magnitude values. Additionally, the array of SNR values is modulated using the angle values in the array of angle values to obtain an array of modulated SNR values. The array of modulated SNR values is normalized to create an array of normalized modulated SNR values. A time-series forecasting model is trained using the array of normalized modulated magnitude values and the array of normalized modulated SNR values.

With respect to prediction functionality, an array of magnitude values of wireless communication properties is obtained and an array of angle values of wireless communication properties is obtained. Each angle corresponds, by a time, to at least one magnitude in the array of magnitude values. The magnitude values in the array of magnitude values are modulated with the corresponding angle values in the array of angle values to obtain an array of modulated magnitude values. The array of modulated magnitude values is normalized to create an array of normalized modulated magnitude values. One or more predicted SNR values are obtained from a trained time-series forecasting model, as a result of inputting the normalized modulated array of magnitude values into the time-series forecasting model. These SNR values can then be used to predict link outages. For example, if a predicted SNR falls below some predetermined level, or a series of predicted SNR values is trending a certain way, a link outage can be predicted. Based on predicted link outages, a mobile network can be evaluated to determine if existing links are sufficient to absorb the outages, or if new links need to be formed between nodes in the mobile network.

Additional details are now illustrated. Referring now to FIG. 1, an example mobile network 100 is shown. Several different types of nodes are illustrated in the mobile network 100. For example, high-speed mobile nodes 102-1 and 102-2 are shown traveling in directions 104-1 and 104-2 respectively. These nodes 102-1 and 102-2 are capable of traveling at high speeds as compared to other nodes and are maneuverable so as to be able to change pitch, roll, and yaw quickly as compared to other nodes. Examples of such nodes may include highly maneuverable aircraft, such as jet fighter aircraft, stunt aircraft, or the like.

A moderate speed mobile node 106-1 is illustrated traveling in a direction 104-3. The moderate speed mobile node 106-1 is not capable of traveling at the same high speeds as the high-speed mobile nodes. Furthermore, the moderate speed mobile node 106-1 are less maneuverable than the high-speed mobile nodes in that they are not able to change pitch, roll, and yaw at the same quick rates as the high-speed nodes are able to. One example of such a node is an Airborne Warning And Control (AWAC) System.

FIG. 1 further illustrates a number of stationary nodes 108-1, 108-2, and 108-3. As indicated by their name, these nodes do not change physical locations in an environment. However, these nodes may include antennas that are capable of changing angle values along 1, 2, or 3 axes during various communication operations when the mobile network 100 is operating.

FIG. 1 further illustrates various links 110-1, 110-2, 110-3, 110-4, and 110-5. The various links may have various qualities of operation. For example, link 110-3 may be capable of high-bandwidth communications as compared to other links in that it is able to support a high throughput of data at an acceptable SNR as determined by some predetermined SNR threshold as compared to other links or as compared to some predetermined threshold for determining link quality. In contrast, links 110-1 and 110-2 may be degraded links in that they support only a lower throughput of data at some predetermined SNR threshold as compared to other links or as compared to a predetermined threshold for determining link quality. Links 110-4 and 110-5 may not be operating links per se, but rather represent links that could be formed if needed to ensure proper operation of the mobile network 100.

As noted previously, if nodes are not active in establishing new links before prior links break, or are otherwise not capable of supporting a particular amount of data throughput, they risk becoming isolated from the mobile network 100 or even causing network fragmentation and adversely affecting other nodes in the network. One of physical layer topology management's main objectives is to mitigate link outages through outage prediction and reforming the physical links to meet mission objectives. Accurately predicting link outages is a difficult problem with high computational complexity for embedded devices.

However, embodiments illustrated herein use deep learning to predict future link outages. Using these predictions, embodiments can form new links to compensate for predicted outages when they occur. The link outages can be predicted, in some embodiments, by predicting future SNR of links.

To accomplish the predictions, embodiments first train a neural network or other machine learning model for link outage predictions. The training data used to train the neural network includes historical arrays of magnitude values of wireless communication properties, corresponding arrays of angle values of wireless communication properties, and SNR values corresponding to the magnitude values and angle values collected at various points in the mobile network 100. Note that typically, magnitude values and angle values correspond to each other by a given time at which they occur. That is, a magnitude value and a corresponding angle value will occur at the same time, or at least within some predetermined window of each other. In contrast, the SNR values correspond to the magnitude values and angle values by a predetermined time offset. For example, an SNR value may be an SNR value that occurs 20 seconds after the magnitude value and angle value occur. This offset enables the predictive training functionality described below.

Examples of magnitude values of wireless communication properties include signal strength, antenna gain, transmission distance, transmission power, node speed, measured SNR values, etc. Examples of angle values of wireless communication properties include vehicle attitude, antenna attitude, signal direction of arrival, etc.

Magnitude values of wireless communication properties are modulated with corresponding angle values of wireless communication properties to obtain modulated magnitude values. The modulated magnitude values are normalized to create normalized, modulated magnitude values. Similarly, the SNR values correlated by a time offset are also modulated using the corresponding angle values and normalized to create normalized modulated SNR values. A time-series forecasting model is trained using the normalized modulated magnitude values and the normalized modulated SNR values. The time offset enables the predictive training.

For example, in the Example illustrated in FIG. 1, A transmission power of a signal from the mobile node 102-1 to the mobile node 106-1 may be measured at some time $t_1$. The attitude of the mobile node 102-1 with respect to the ground may also be determined at time $t_1$. At some future time $t_2$, the SNR of the signal may be measured at the node 106-1. In this example, $t_2$ is time delayed from $t_1$ by a predetermined amount, such as, for example, 20 seconds. Multiple other values of transmission power, node attitude, and measure SNR are collected into corresponding arrays. The arrays are operated on as described above to create training arrays, which are used to train a time-series forecasting model.

For predictions, data is gathered, including arrays of magnitude values of recently occurring wireless communication properties and arrays of angle values of recently occurring wireless communication properties, each angle corresponding to a magnitude in the one or more arrays of magnitude values. Each of the magnitude values of wireless communication properties is modulated with the corresponding angle values of wireless communication properties to obtain modulated magnitude values. The modulated magnitude values are normalized to create normalized, modulated magnitude values. The normalized, modulated magnitude values are provided to the trained, time-series forecasting model, and one or more predicted SNR values are obtained from the trained, time-series forecasting model. These obtained SNR values can then be used to predict outages. In some embodiments, the trained, time-series forecasting model will be provided with a set of sequential inputs (e.g., normalized, modulated magnitude values) and will output a set of sequential labels (e.g., SNR values). Analysis of the labels can be used to predict link outages.

Figure 2:
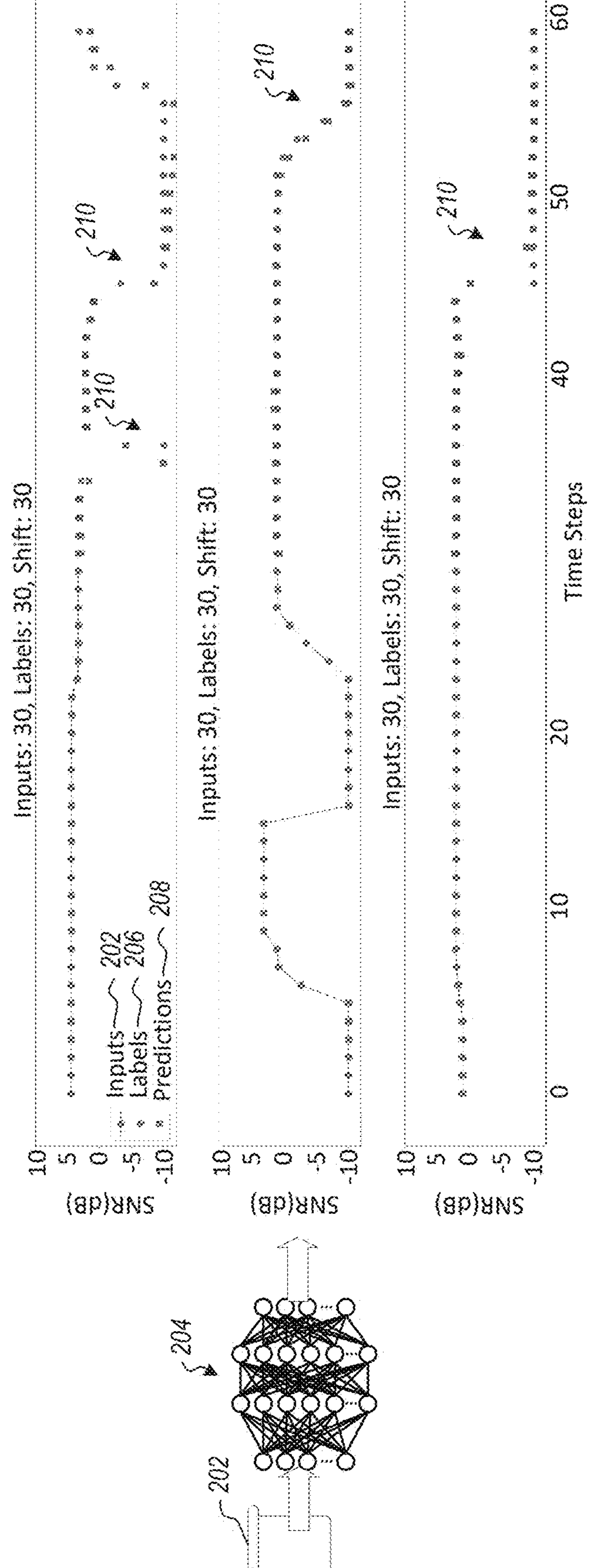
FIG. 2 illustrates a trained time-series forecasting model, along with a graph illustrating inputs into the time series forecasting model and output labels and predictions.

For example, reference is now made to FIG. 2. FIG. 2 illustrates inputs 202 being input into the trained, time-series forecasting model 204. The trained, time-series forecasting model 204 outputs labels 206 and predictions 208. Outages can be predicted as illustrated at the regions 210. Thus, embodiments can identify where links in the mobile network 100 are anticipated to experience outages.

Figure 3:
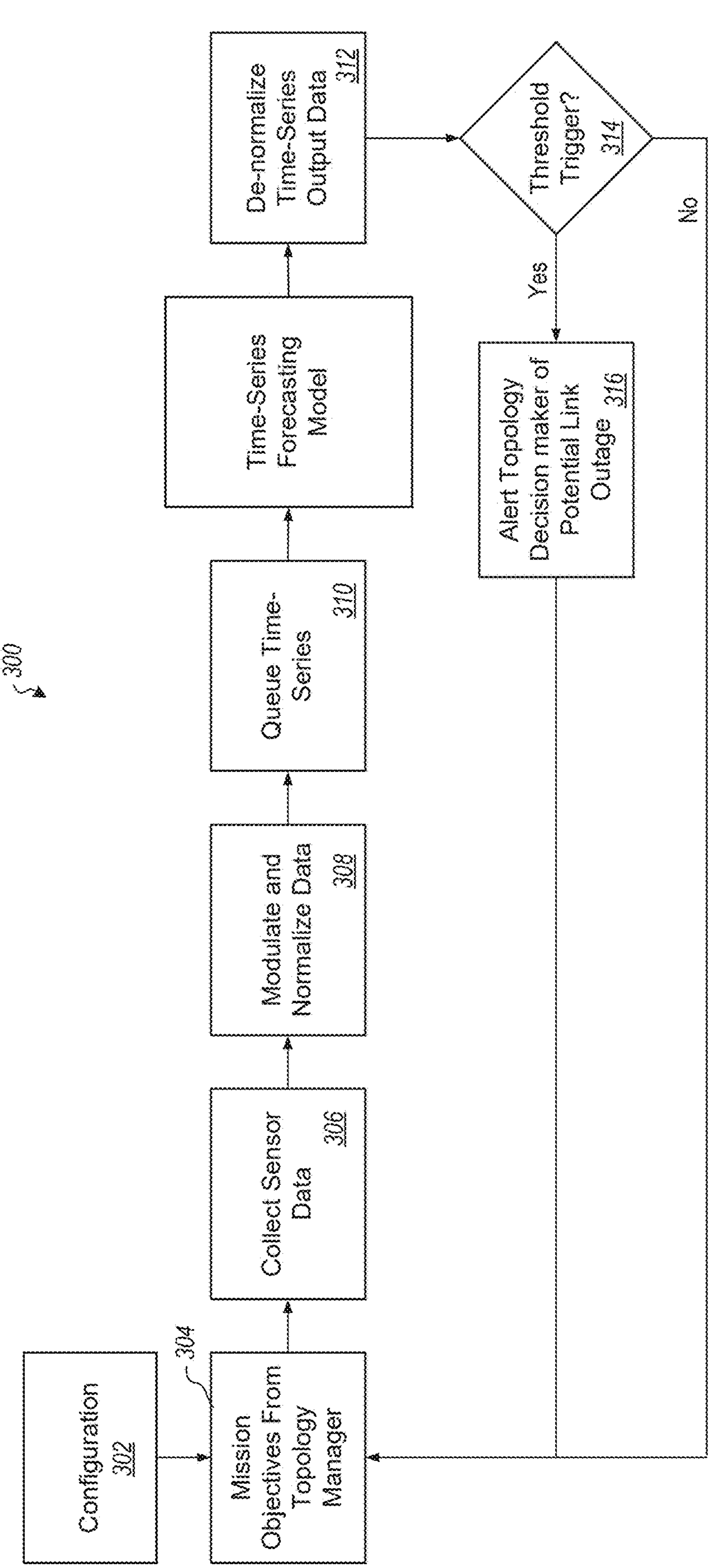
FIG. 3 illustrates a process for identifying potential link outages.
Figure 4:
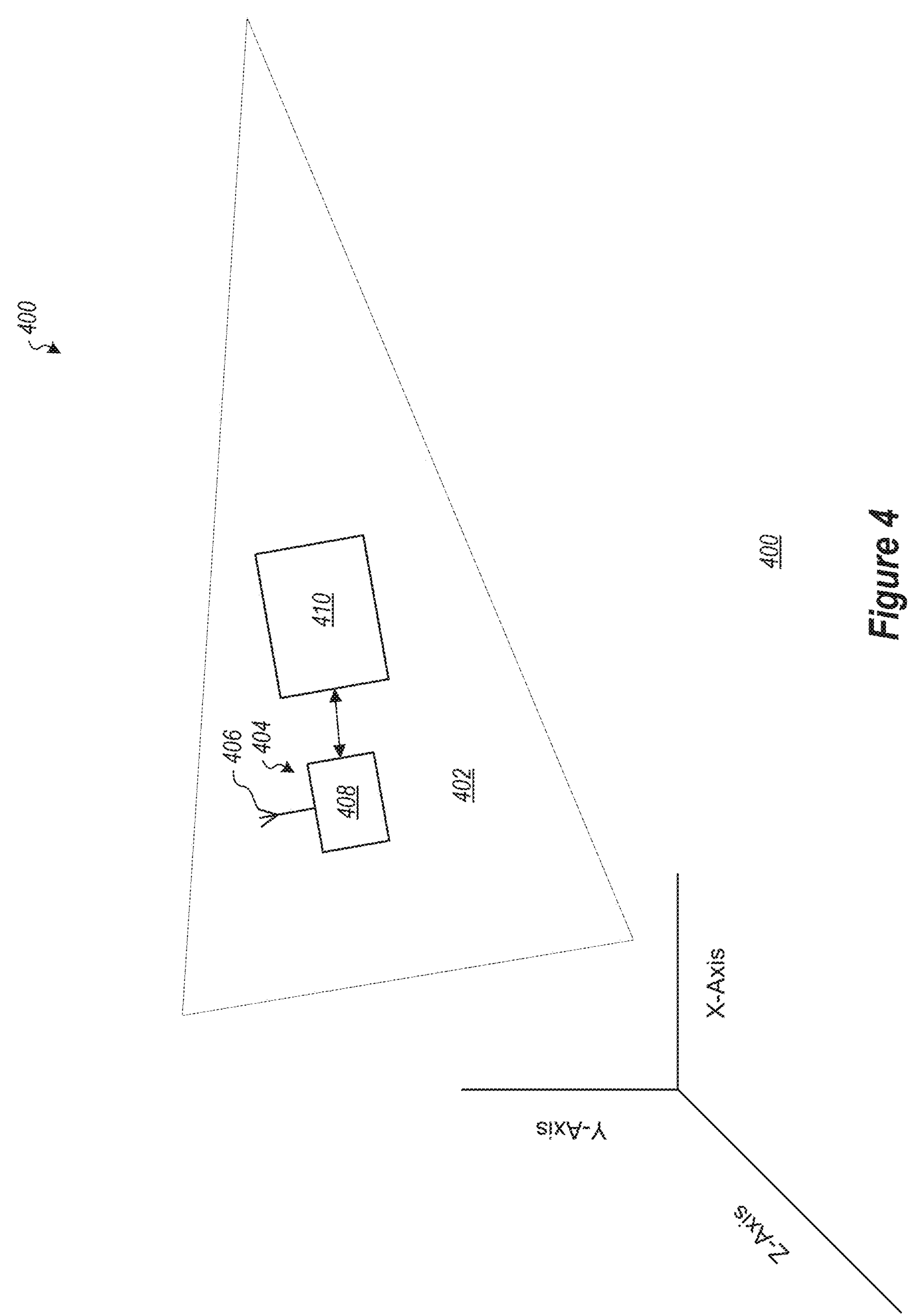
FIG. 4 illustrates an example node in a mobile network.

Referring now to FIG. 3, a process 300 is illustrated. Reference is also made to FIG. 4, which illustrates an example node 402. In this example, the node 402 is a mobile node operating in an environment 400. The mobile node has an attitude with respect to a reference point such as the ground, a direction of travel with respect to a reference point such as the ground, a speed of travel, and a distance from a reference point such as a neutral reference point or another node.

The node 402 also includes communication hardware 404. In this example, the communication hardware 404 includes an antenna 406 configured to send and/or receive wireless signals. The antenna 406 can have an attitude with respect to various reference points. In some embodiments, the antenna 406 has an attitude based on the attitude of the node 402 itself. However, the antenna 406 may be mounted to various actuators that allow the antenna 406 to have a variable attitude with respect to a point on the node 402 itself. Thus, the antenna 406 may have a variable attitude that is a function of the node 402 itself and/or a function of positions of variable actuators coupled to the antenna 406. Note that while a single antenna 406 is illustrated, it should be appreciated that embodiments may include a plurality of antennas, such as for implementing antenna arrays, for implementing different antennas for transmitting than for receiving, for implementing different antennas on different faces of the node 402, etc.

The communication hardware 404 further includes signal processing hardware 408 coupled to the antenna 406. Such signal processing hardware may include transmission lines, amplifiers, attenuators, matching circuits, mixing circuits, signal conditioners, filters, and/or other components or combinations thereof. These components may be used for operating on signals to be transmitted or received signals. Some embodiments include within the communication hardware components that are used to measure signal strengths, SNR values, direction of arrival of received signals, direction of transmission of transmitted signals, antenna gain of received signals, and/or other magnitude values and/or angle values of wireless communication properties.

FIG. 4 further illustrates a computing system 410. The computing system 410 may have various processors, storage, and/or communication hardware.

Returning now to FIG. 3, at 302, configuration is performed. Here, embodiments configure data requirements and deep learning agent constraints such as a time forecast window for prediction, number of predicted samples per second, offset, and number of prediction samples. This configuration may be performed at the computing system 410. Alternatively, or additionally, configuration may be performed at combinations of computing systems on various nodes in a mobile network. In particular, in some embodiments, mobile network management is distributed in nature such that various management tasks, including configuration, are performed collaboratively across multiple nodes in the mobile network.

At 304, mission objectives are configured based on information from a topology manager. The topology manager is typically implemented as an application in a distributed fashion across the various nodes in the mobile network in computing systems such as computing system 410 and other corresponding computing systems. Various nodes will include software and hardware to implement the topology manager. Embodiments may dynamically configure prediction parameters behavior to meet mission objectives. For example, embodiments may specify certain minimum SNR values for communications, certain link topologies for nodes, etc. to ensure adequate communication in the mobile network to meet mission objectives.

At 306, embodiments collect sensor data. For example, the embodiments can collect link budget data at the computing system 410 using the signal processing hardware 408. Embodiments can collect, at the computing system 410, navigation information, including attitude, speed, acceleration, direction of travel, etc., from flight control systems of the node 402. The computing system 410 can collect direction-of-arrival of signals from the communication hardware 404 by using an antenna array represented by the antenna 406 and the signal processing hardware 408. In particular, direction-of-arrival can be determined by measuring signal strengths on different antenna elements to determine from what direction a signal is arriving. The computing system 410 can collect received signal strength from the signal processing hardware 408. The computing system 410 can collect antenna gain from the signal processing hardware 408. The computing system 410 can collect transmit power from the signal processing hardware 408. The computing system 410 can collect distance between nodes from navigation and/or tracking hardware, such as GPS, radar or other hardware included on the various nodes.

At 308, embodiments modulate and normalize collected data. In particular, embodiments process and normalize data to a standard distribution for input to a deep learning agent. For example, embodiments modulate link budget data, such as antenna gain and SNR [sometimes expressed as Eb/NO (Energy per bit/Noise)] on top of a periodic waveform created by the oscillation of the link direction of arrival (DOA) through the antenna pattern and the attitude of the mobile node. In particular, various communication property magnitude values are modulated using communication property angle values. For example, antenna gain could be modulated using corresponding direction of arrival angle values. Alternatively, Eb/NO could be modulated using corresponding direction of arrival angle values. Alternatively, antenna gain could be modulated using node or antenna attitude angle values. Alternatively, Eb/NO could be modulated using node or antenna attitude angle values. While various examples have been shown here, it should be appreciated that other collected communication related magnitude values (including magnitude values of node travel) and other collected communication related angle values (including attitudes of nodes) can be used for modulation, whereby magnitude values are modulated by angle values. The modulated data is then normalized. The following illustrates expressions of modulation and normalization:

Antenna Gain and DOA:

$$\text{Modulated: } G_\theta = G\sin\theta$$

$$\text{Normalized: } \lambda(G_\theta) = \frac{G_\theta - E[G_\theta]}{\sqrt{E\left[(G_\theta)^2\right] - (E[G_\theta])^2}} = \frac{G - \mu_{G_\theta}}{\sigma_{G_\theta}}$$

Eb/N0 and DOA:

$$\text{Modulated: } \sum\nolimits_\theta = \sum \sin\theta$$

$$\text{Normalized: } \lambda\left(\sum\nolimits_\theta\right) = \frac{\sum - \mu_{\Sigma_\theta}}{\sigma_{\Sigma_\theta}}$$

Antenna Gain and Attitude:

$$\text{Modulated: } G_\phi = G\sin\phi$$

$$\text{Normalized: } \lambda(G_\phi) = \frac{G - \mu_{G_\phi}}{\sigma_{G_\phi}}$$

Eb/N0 and Attitude:

$$\text{Modulated: } \sum\nolimits_\phi = \sum \sin\phi$$

$$\text{Normalized: } \lambda\left(\sum\nolimits_\phi\right) = \frac{\sum - \mu_{\Sigma_\phi}}{\sigma_{\Sigma_\phi}}$$

Where:

T: number of time steps

θ: (T×1) time-series array of direction of arrival of link

ϕ: (T×1) time-series array of node attitude

G: (T×1) time-series array of antenna gains

Σ: (T×1) time-series array of Eb/NO values

λ(•): (T×1) normalized time-series array of a given link budget value

In these examples, $\lambda(G_\theta)$, $\lambda(\Sigma_\theta)$, $\lambda(G_\phi)$, $\lambda(\Sigma_\phi)$ . . . λ(•) are provided as the inputs 202 into the trained time-series forecasting model. Note that λ(•) represents that various different communication magnitude values and angle values and/or combinations thereof can be used although not specifically enumerated here.

Further note that the following expression is a generalized expression and explanation of how normalization can be accomplished by using a standard distribution:

$$\lambda(X) = \frac{X - E[X]}{\sqrt{E\left[(X)^2\right] - (E[X])^2}} = \frac{G - \mu_X}{\sigma_X}$$

Where:

T: number of time steps

E[X]: is the expectation or mean of random variable X

X: is a length (T×1) time-series array of data $\mu_X$: is a length (T×1) time-series array of the expectation (or mean) of random variable X $\sigma_X$: is a length (T×1) time-series array of the standard deviation of random variable X λ: is the length (T×1) time-series array of random variable x fit to a standard distribution While the preceding has illustrated certain particular magnitude values and angle values, various other magnitude values and angle values can be used. Indeed, in some embodiments, multiple magnitude values can be combined and modulated with one or multiple angle values.

FIG. 3 illustrates at 310 queuing a time-series. In particular, a computing system such as computing system 410 maintains queue of data to create time-series for successive input to deep learning agent. FIG. 2 illustrates a number of time-series shown as strings of input. These time-series are input as the input 202 illustrated in FIG. 2.

FIGS. 2 and 3 illustrate the trained time-series forecasting model 204. The trained time-series forecasting model 204 is, in some embodiments, a supervised deep learning agent that has been trained to recognize the oscillation of magnitude values modulated with angle values. In particular, the trained time-series forecasting model 204 is created by inputting normalized modulated magnitude values of wireless communication properties, where the magnitude values are modulated with the corresponding angle values of wireless communication properties, along with one or more SNR values corresponding to the magnitude values of wireless communication properties and the angle values of wireless communication properties, such that the trained time-series forecasting model 204 is trained to subsequently predict future SNR values when provided normalized modulated magnitude values of wireless communication properties.

FIG. 3 illustrates at 312 de-normalizing time-series output data. In particular, embodiments can use computing systems such as computing system 410 to return output data to the original, unnormalized distribution to get an accurate sample of SNR prediction.

FIG. 3 illustrates at 314 that a determination is made as to whether or not a threshold trigger has been reached. Embodiments can use computing systems such as computing system 410 to determine if a predicted SNR value from the time-series forecasting model crosses a configuration threshold. If it is determined that a predicted SNR value crosses a configuration threshold, an alert about a predicted link outage can be provided to a topology decision maker as illustrated at 316. The topology decision maker component is a physical layer configuration component, which may be part of the distributed mobile network management that determines to make new links in the mobile network. Thus, the topology decision maker component can cause the mobile network to be reconfigured to meet mission objectives.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
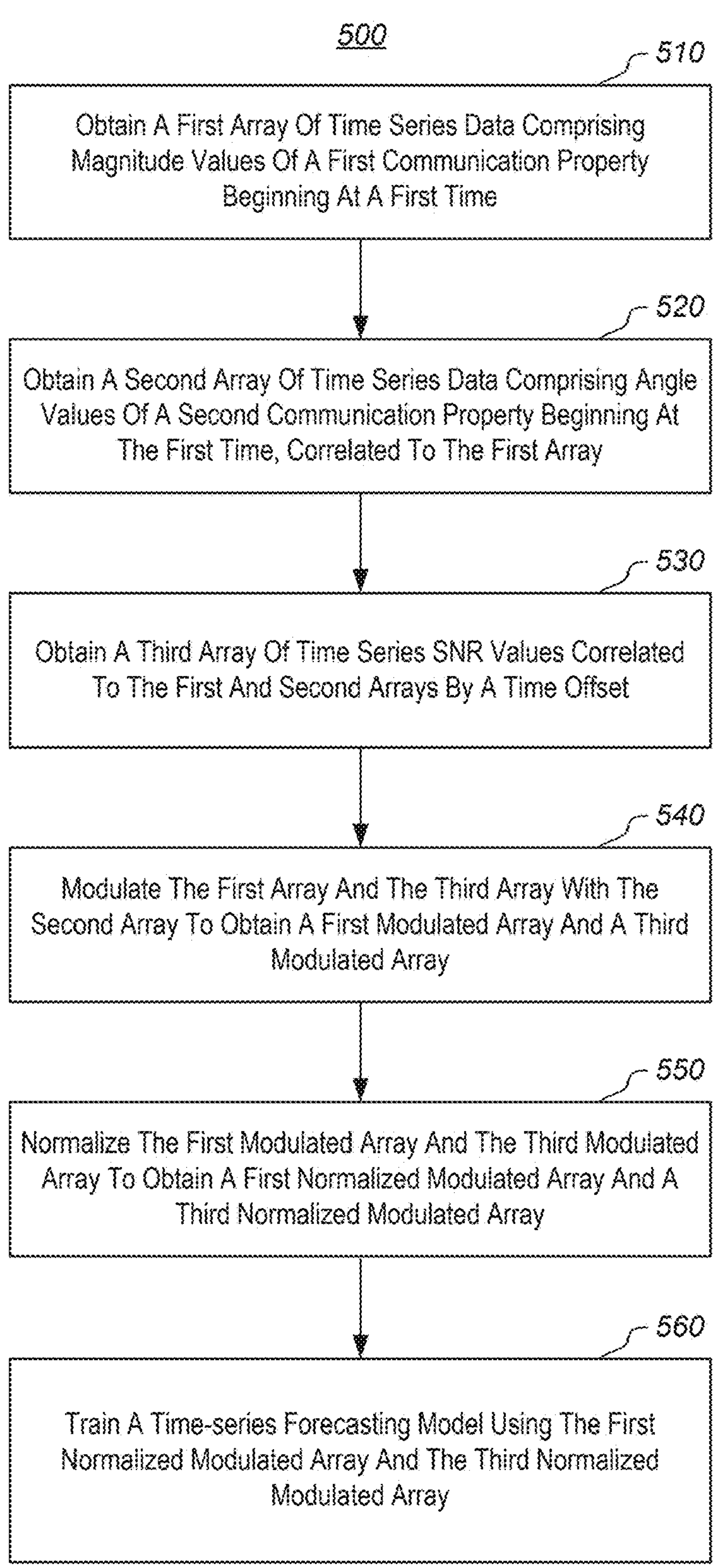
FIG. 5 illustrates a method of training a neural network for link outage prediction in mobile networks.

Referring now to FIG. 5, a method 500 is illustrated. The method 500 includes acts for training a machine learning model for link prediction. The method 500 obtaining a first array of time series data comprising magnitude values of a first communication property beginning at a first time (act 510).

The method 500 further includes obtaining a second array of time series data comprising angle values of a second communication property beginning at the first time, correlated to the first array (act 520).

The method 500 further includes obtaining a third array of time series SNR values correlated to the first and second arrays by a time offset (act 530).

The method 500 further includes modulating the first array and the third array with the second array to obtain a first modulated array and a third modulated array (act 540).

The method 500 further includes normalizing the first modulated array and the third modulated array to obtain a first normalized modulated array and a third normalized modulated array (act 550).

The method 500 further includes training a time-series forecasting model using the first normalized modulated array and the third normalized modulated array (act 560).

The method 500 may be practiced where the magnitude values comprise at least one of signal strength, antenna gain, transmission distance, transmission power, measured SNR values, etc.

The method 500 may be practiced where the angle values comprise at least one of vehicle attitude, antenna attitude, direction of arrival, etc.

The method 500 may be practiced where the arrays of magnitude values comprise magnitude values that are combinations of different types of magnitude values. For example, embodiments may combine signal strength and transmission distance to create combined magnitude values, which is then modulated by associated angle values. While not enumerated here, other magnitude values of other properties may be combined to create a combined magnitude. Magnitude values may be combined by addition, averaging, and/or other operations.

The method 500 may be practiced where the arrays of angle values comprise angle values that are combinations of different types of angle values. For example, embodiments may combine vehicle attitude and signal direction of arrival to create a combined angle. This combined angle may be used to modulate magnitude values. While not enumerated here, other angle values of other properties may be combined to create a combined angle values. Magnitude values may be combined by addition, averaging, and/or other operations.

Figure 6:
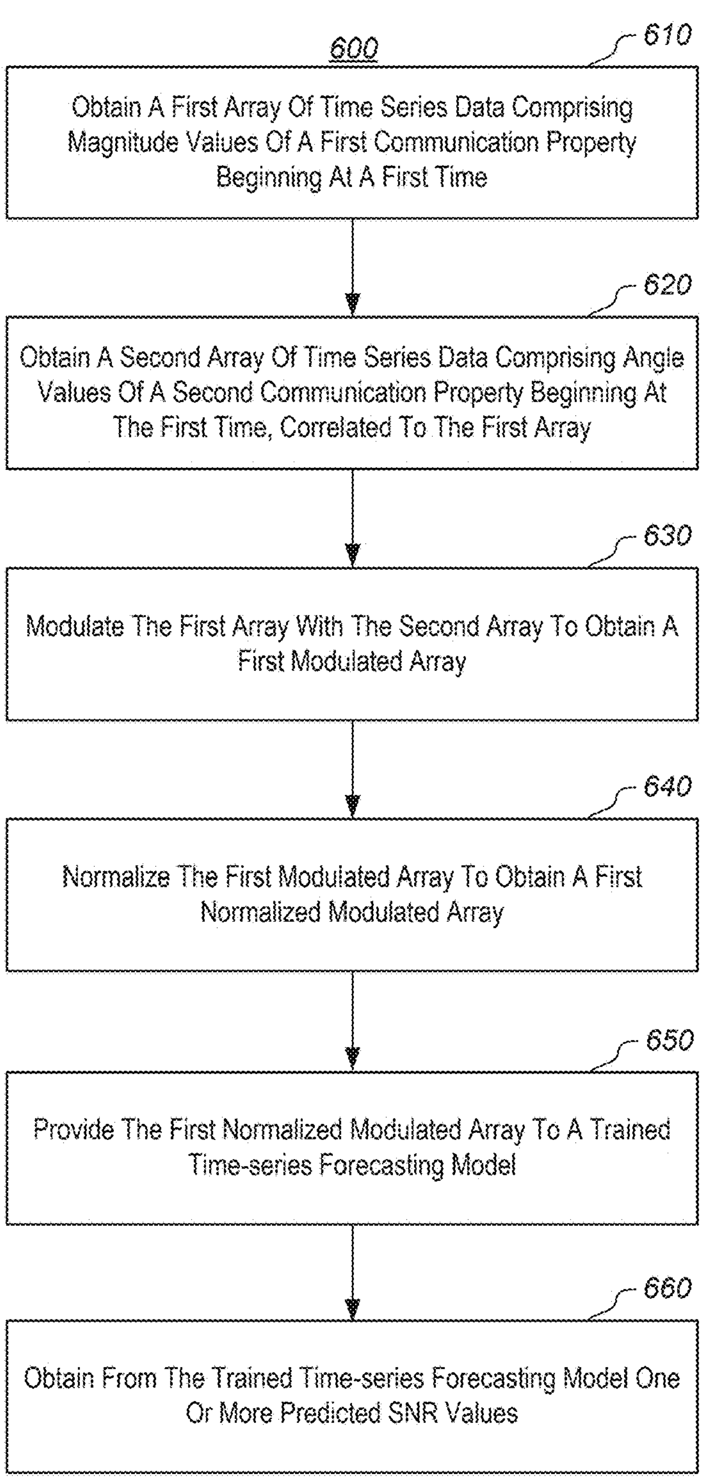
FIG. 6 illustrates a method of predicting link outages in a mobile network.

Referring now to FIG. 6, a method 600 is illustrated. The method 600 includes acts for predicting link outages in a mobile network. The method 600 includes obtaining a first array of time series data comprising magnitude values of a first communication property beginning at a first time (act 610).

The method 600 further includes obtaining a second array of time series data comprising angle values of a second communication property beginning at the first time, correlated to the first array (act 620).

The method 600 further includes modulating the first array with the second array to obtain a first modulated array (act 630).

The method 600 further includes normalizing the first modulated array to obtain a first normalized modulated array (act 640).

The method 600 further includes providing the first normalized modulated array to a trained time-series forecasting model (act 650).

The method 600 further includes, as a result, obtaining from the trained time-series forecasting model one or more predicted SNR values (act 660).

The method 600 may further include optimizing a number of array inputs. For example, embodiments may be configured to adjust the number of array inputs input into the trained time-series model to obtain more accurate results with respect to predicted SNR values.

The method 600 may further include optimizing array length. For example, embodiments may be configured to adjust array input lengths input into the trained time-series model to obtain more accurate results with respect to predicted SNR values.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of training a machine learning model for link prediction comprising:
- obtaining a first array of time series data comprising magnitude values of a first communication property beginning at a first time;
- obtaining a second array of time series data comprising angle values of a second communication property beginning at the first time, correlated to the first array;
- obtaining a third array of time series SNR values correlated to the first and second arrays by a time offset;
- modulating the first array and the third array with the second array to obtain a first modulated array and a third modulated array;
- normalizing the first modulated array and the third modulated array to obtain a first normalized modulated array and a third normalized modulated array; and
- training a time-series forecasting model using the first normalized modulated array and the third normalized modulated array.

2. The method of claim 1, wherein the magnitude values comprise at least one of signal strength, antenna gain, transmission distance, transmission power, node speed, or measured SNR.

3. The method of claim 1, wherein the angle values comprise at least one of vehicle attitude, antenna attitude, or signal direction of arrival.

4. The method of claim 1, wherein the first array comprises magnitude values that are combinations of different types of magnitude values.

5. The method of claim 1, wherein the second array comprises angle values that are combinations of different types of angle values.

6. The method of claim 1, wherein the magnitude values comprise antenna gain values and the angle values comprise signal direction of arrival values.

7. The method of claim 1, wherein the magnitude values comprise measured SNR and the angle values comprise signal direction of arrival values.

8. The method of claim 1, wherein the magnitude values comprise antenna gain values and the angle values comprise vehicle or antenna attitude values.

9. The method of claim 1, wherein the magnitude values comprise measured SNR and the angle values comprise vehicle or antenna attitude values.

10. A method of predicting link outages in a mobile network, the method comprising:

obtaining a first array of time series data comprising magnitude values of a first communication property beginning at a first time;

obtaining a second array of time series data comprising angle values of a second communication property beginning at the first time, correlated to the first array;

modulating the first array with the second array to obtain a first modulated array;

normalizing the first modulated array to obtain a first normalized modulated array; and providing the first normalized modulated array to a trained time-series forecasting model; and as a result, obtaining from the trained time-series forecasting model one or more predicted SNR values.

11. The method of claim 10, further comprising optimizing a number of array inputs into the trained time-series forecasting model.

12. The method of claim 10, further comprising optimizing array length of the first normalized modulated array.

13. The method of claim 10, wherein the magnitude values comprise at least one of signal strength, antenna gain, transmission distance, transmission power, node speed, or measured SNR values.

14. The method of claim 10, wherein the angle values comprise at least one of vehicle attitude, antenna attitude, or signal direction of arrival values.

15. The method of claim 10, wherein first array comprises magnitude values that are combinations of different types of magnitude values and the second array comprises angle values that are combinations of different types of angle values.

16. The method of claim 10, wherein the magnitude values comprise antenna gain values and the angle values comprise signal direction of arrival values.

17. The method of claim 10, wherein the magnitude values comprise measured SNR values and the angle values comprise signal direction of arrival values.

18. The method of claim 10, wherein the magnitude values comprise antenna gain values and the angle values comprise vehicle or antenna attitude values.

19. The method of claim 10, wherein the magnitude values comprise measured SNR values and the angle values comprise vehicle or antenna attitude values.

20. A computer system comprising:

one or more processors; and one or more computer-readable media having stored thereon instructions that are executable by the one or more processors to configure the computer system to predict link outages in a mobile network, including instructions that are executable to configure the computer system to perform at least the following:

obtain a first array of time series data comprising magnitude values of a first communication property beginning at a first time;

obtain a second array of time series data comprising angle values of a second communication property beginning at the first time, correlated to the first array;

modulate the first array with the second array to obtain a first modulated array;

normalize the first modulated array to obtain a first normalized modulated array; and provide the first normalized modulated array to a trained time-series forecasting model; and as a result, obtain from the trained time-series forecasting model one or more predicted SNR values.

* * * * *